June 18, 1963 A. V. BALISTER 3,094,283
LUBRICATING DEVICE
Filed July 25, 1962

INVENTOR.
ALEX V. BALISTER
BY Irwin C. Alter
ATTORNEY

United States Patent Office 3,094,283
Patented June 18, 1963

3,094,283
LUBRICATING DEVICE
Alex V. Balister, 4934 W. Eccert Place, Milwaukee, Wis.
Filed July 25, 1962, Ser. No. 212,348
5 Claims. (Cl. 239—393)

My invention relates to a lubricating device, and more particularly to a device employed for directing a stream of lubricating medium, to a work piece and tool in the machining operation or the like.

The object of my invention is to provide a device of the character described that is adaptable for use with any type of mechanism or machine.

Another object of the invention is to provide a device that will enable lubricating liquid to be directed and applied to the tool and work piece, at any predetermined angle, and in any shape or contour.

A still further object of the invention is to provide a device that is adjustable without any mechanical skill, or without the use of any special mechanical equipment.

An even still further object of the invention is to provide a device that is equipped with a plurality of apertures acting as discharge ports for the lubricant led under pressure, so that a stream of selectable shape may be applied to a tool and work piece, while the operation is being performed.

The device is simple in construction, easy and economical to manufacture, and has many applications.

Other and further objects of my invention will become more apparent as the description proceeds, when taken in conjunction with the drawings, in which.

Figure 1:
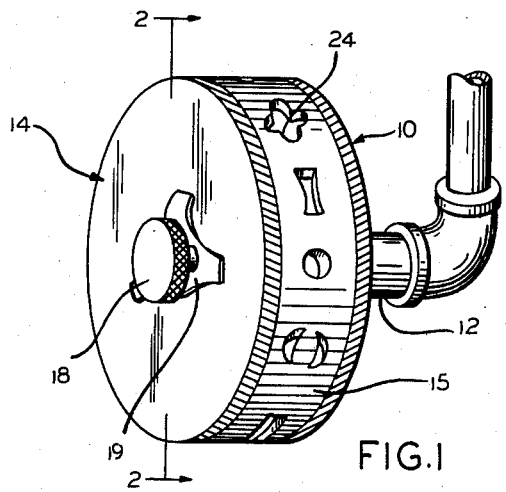
FIGURE 1 is a perspective view of the entire assembled device adaptable for application onto any tubular lubricating means.
Figure 3:
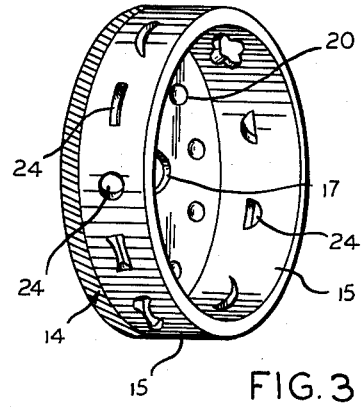
FIGURE 3 is a perspective view of a revolvable shell used for selectably directing different shaped streams to a tool or work piece.

Similar characters of reference indicate corresponding parts throughout the several views, and referring now to the same, the character 10 shows a body of cylindrical design, equipped with a centrally disposed aperture 11, shown threaded on its inner face, to accommodate the lubricating supply line shown in the form of a conventional pipe 12. It should, however, be realized that the device may be constructed to accommodate any other source of tubular lubricating supply line. A tubular port 13 extends from the central aperture 11 and has its outlet 13' on the outer periphery of the body 10.

A cap member 14, equipped with a radial flange 15, extending at right angles to the cap 14, accommodates the insertion of the body 10. The radial flange 15 has differently shaped perforations 24 in it for the purpose of creating different shaped lubricating streams. A centrally disposed screw 16 rotatively journals the cap member 14 with respect to the body 10. The screw 16 leads from the aperture 11 in the body 10, through an opening 17 in the cap 14, and is provided with a clamping member 18 which threadedly engages the screw 16.

A knurled headed knob 18 threadedly engages the screw 16 and has a locking device 19 interposed therebetween which presses the cap 14 against the body 10 and presses against the knob 18. The pressure causes the cap 14 and body 10 to be held tightly together. Although I have illustrated a knurled knob 18 acting in combination with the screw 16 for holding the cap and body together, this invention can include any means for holding said cap and knob together.

The inner face of the cap 14 is provided with a plurality of recesses 20 to receive a ball bearing 21 held in engagement therewith by a resilient spring member 22 disposed in a recess 20' in the body 10.

Figure 2:
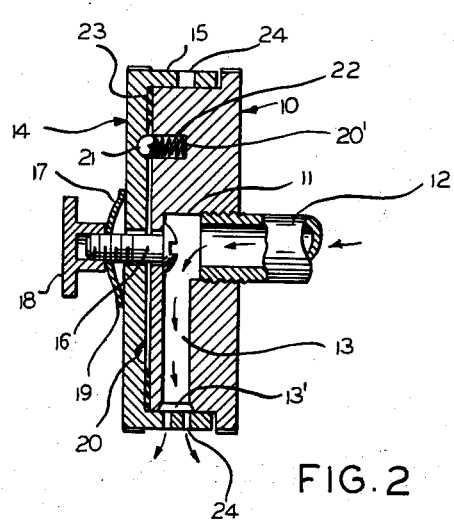
FIGURE 2 is a longitudinal cross-sectional view of the assembled device shown in FIG. 1, taken on a plane passing through the line 2—2.
Figure 4:
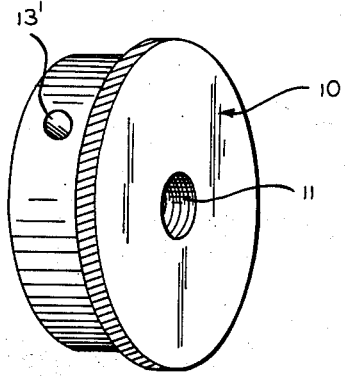
FIGURE 4 is a perspective view of the body of the device arranged for receiving the shell, and for its attachment to the lubricating supply tube.

The cap 14 is held in direct engagement with the body 10 against a circular gasket shown as 23 to provide a complete seal. When the cap 14 is revolved so that the outlet 13' of the tubular port 13 is in direct alignment with one of the plurality of perforations 24 in the flange 15 of the cap 14, it will permit the flow of the lubricant as shown by the arrows (see FIG. 2) Each of the semi-cylindrical recesses are disposed so that when the ball bearing 21 is actuated thereagainst one of the perforations is aligned with the opening 13' of the tubular port 13. The resiliently actuated ball bearing 21 accordingly acts as an indexing means.

The perforations 24 in the flange 15, are shown in varied designs and are shaped to permit a flow of lubricant of varied shapes to be directed onto the tool and work piece (not shown), during the machining operation. When the cap 14 is revolved to a point where the opening 13' of the tubular port 13 is between the perforations 24, the flow of lubricant will be completely shut off.

From the above description it will become manifest, that the assembled device may be applied to any type of tube conveying the lubricant, and the cap may be revolved to bring the right perforation 24 in alignment with the tubular port 13, thereby forcing a flow of the lubrication medium of a certain shape toward the tool and the work piece.

Although I have shown a specific structure and arrangement of the component parts constituting my invention, I am fully cognizant of the fact that many changes may be made in the shape, form and configuration of the parts without affecting their operativeness, and I reserve the rights to make such changes without departing from the spirit of my invention or the scope of the appended claims.

I claim:
1. A lubricating device comprising: a body having a cylindrical periphery, said body having a centrally disposed aperture shaped to be associated with a lubricating supply line, said body having a tubular port in communication with said centrally disposed aperture, said tubular port leading to the outer periphery of said cylindrical body, and having an opening thereon, and a cap having a radial flange that is rotatively mounted on said cylindrical periphery of said body, said flange having different shaped perforations at selectable points, said perforations being alignable with said opening of said tubular port, and means for selectively aligning each of said different shaped perforations with said opening of said tubular port, whereby a stream of lubricant of a selectable shape may be created.

2. A lubricating device, as defined in claim 1, said body having a semi-cylindrical recess, said cap having a plurality of recesses that are each alignable with said body's recess, a ball bearing interposed between said cap and said body and being disposed in said body's semi-cylindrical recess, and a resilient means being associated with said body and urging said ball bearing against said cap, said ball bearing being forced against each of said body's semi-cylindrical recesses when each of said recesses is aligned with said recess of said body, said recesses being disposed on said cap for said perforations to be aligned with said opening of said tubular port when each of said cap's recesses is aligned with said recesses on said body; whereby said ball bearing causes said cap to be locked in position with respect to said body when each of said perforations is aligned with said tubular port's opening.

3. A lubricating device, as defined in claim 2, wherein said resilient means is a spring, and said body has a cylindrical means to receive said spring therein.

4. A lubricating device, as defined in claim 3, wherein said cap and body have means for holding said members tightly together, and gasket means interposed between said members for creating a seal therebetween.

5. A lubricating device, as defined in claim 4, said means for holding said cap and body together consists of a threaded member protruding axially therethrough, and a knurled knob attached to said threaded member at the outside of said cap, said knurled knob exerting pressure on said cap and said body to hold said members together.

References Cited in the file of this patent

UNITED STATES PATENTS

| 630,468 | Quayle | Aug. 8, 1899 |
| 1,554,521 | Reece | Sept. 22, 1925 |

FOREIGN PATENTS

| 532,238 | Great Britain | Jan. 21, 1941 |